US009661373B2

(12) United States Patent
Akimchuk, III et al.

(10) Patent No.: US 9,661,373 B2
(45) Date of Patent: May 23, 2017

(54) INTERNET-BASED VIDEO DELIVERY SYSTEM

(71) Applicant: VideoLink LLC, Newton, MA (US)

(72) Inventors: James W. Akimchuk, III, Billerica, MA (US); Leigh Willis, Southborough, MA (US)

(73) Assignee: VideoLink LLC, Newton, MA (US)

( * ) Notice: Subject to any disclaimer, the term of this patent is extended or adjusted under 35 U.S.C. 154(b) by 0 days.

(21) Appl. No.: 14/831,084

(22) Filed: Aug. 20, 2015

(65) Prior Publication Data

US 2015/0358668 A1    Dec. 10, 2015

Related U.S. Application Data

(63) Continuation of application No. 13/796,053, filed on Mar. 12, 2013, now abandoned.
(Continued)

(51) Int. Cl.
*H04N 21/44*    (2011.01)
*H04N 21/422*   (2011.01)
(Continued)

(52) U.S. Cl.
CPC ....... *H04N 21/42204* (2013.01); *H04L 45/64* (2013.01); *H04L 65/605* (2013.01);
(Continued)

(58) Field of Classification Search
None
See application file for complete search history.

(56) References Cited

U.S. PATENT DOCUMENTS 6,774,926 B1 *  8/2004  Ellis ................... H04N 5/44543
                                                    348/14.01
6,981,045 B1 * 12/2005  Brooks ............. H04L 29/06027
                                                    348/E7.073
(Continued)

FOREIGN PATENT DOCUMENTS

EP    1331808 A1    7/2003
EP    2059045 A2    5/2009
(Continued)

OTHER PUBLICATIONS

International Search Report and Written Opinion mailed Sep. 25, 2012 in co-pending PCT application No. PCT/US2012/025426.
(Continued)

*Primary Examiner* — Cai Chen
(74) *Attorney, Agent, or Firm* — Nields, Lemack & Frame, LLC (57) ABSTRACT

A system and method for delivering content over the Internet from a content source to a destination is disclosed which includes the use of an overlay network, built on an underlying IP network. Additionally, error correction capability is added to the overlay network to allow the destination to reconstitute packets lost during the transmission over the Internet. In one embodiment, an overlay network is created using a plurality of overlay nodes, which may be geographically distributed, either throughout the country or throughout the world. Each respective content source or destination is also a part of the overlay network. Overhead, capable of providing error correction capability, is added to the content flow as it enters the overlay network. As the content flow leaves the overlay network, this overhead is removed from the content flow. In the case of transmission errors across the overlay network, the overhead information is used to reconstitute lost or corrupted packets.

13 Claims, 5 Drawing Sheets

Related U.S. Application Data (60) Provisional application No. 61/728,012, filed on Nov. 19, 2012.

(51) Int. Cl.

| | | |
|---|---|---|
| *H04N 21/61* | (2011.01) | |
| *H04N 21/462* | (2011.01) | |
| *H04N 21/2187* | (2011.01) | |
| *H04N 21/222* | (2011.01) | |
| *H04N 21/643* | (2011.01) | |
| *H04N 21/647* | (2011.01) | |
| *H04L 12/715* | (2013.01) | |
| *H04L 29/06* | (2006.01) | |
| *H04N 5/232* | (2006.01) | |

(52) U.S. Cl.
CPC ..... *H04N 5/23206* (2013.01); *H04N 21/2187* (2013.01); *H04N 21/2221* (2013.01); *H04N 21/4622* (2013.01); *H04N 21/6125* (2013.01); *H04N 21/6156* (2013.01); *H04N 21/6473* (2013.01); *H04N 21/64322* (2013.01); *H04N 21/64776* (2013.01)

(56) References Cited

U.S. PATENT DOCUMENTS

| | | | |
|---|---|---|---|
| 7,355,975 B2 | 4/2008 | Liu et al. | |
| 7,839,798 B2 | 11/2010 | Tang et al. | |
| 8,181,210 B2 | 5/2012 | Amir et al. | |
| 9,019,372 B2 | 4/2015 | Willis et al. | |
| 9,497,373 B2 | 11/2016 | Willis et al. | |
| 2002/0023165 A1 | 2/2002 | Lahr | |
| 2002/0097322 A1 | 7/2002 | Monroe et al. | |
| 2004/0003051 A1 | 1/2004 | Krzyzanowski et al. | |
| 2004/0078825 A1 | 4/2004 | Murphy | |
| 2006/0242677 A1 | 10/2006 | Kostadinovich | |
| 2009/0040288 A1 | 2/2009 | Larson | |
| 2010/0013918 A1 | 1/2010 | Ta ' Eed | |
| 2010/0014528 A1 | 1/2010 | Amir et al. | |
| 2010/0037265 A1 | 2/2010 | Amir et al. | |
| 2010/0165830 A1* | 7/2010 | Amir | H04L 45/04 370/216 |
| 2011/0109808 A1 | 5/2011 | Li et al. | |
| 2011/0119716 A1 | 5/2011 | Coleman | |
| 2011/0243131 A1 | 10/2011 | Amir et al. | |
| 2012/0212609 A1 | 8/2012 | Willis et al. | |
| 2012/0331109 A1 | 12/2012 | Baum et al. | |
| 2014/0143820 A1 | 5/2014 | Akimchuk, III et al. | |
| 2015/0229825 A1 | 8/2015 | Willis et al. | |
| 2017/0048446 A1 | 2/2017 | Willis et al. | |

FOREIGN PATENT DOCUMENTS

| | | |
|---|---|---|
| JP | 2004-80256 A | 3/2004 |
| JP | 2005-5958 A | 1/2005 |
| JP | 2008-118271 A | 5/2008 |
| WO | 2006/073008 A1 | 7/2006 |

OTHER PUBLICATIONS

International Search Report and Written Opinion mailed Aug. 8, 2013 in corresponding PCT application No. PCT/US2013/44471.
Proceedings of the International Conference on Dependable Systems and Networks (DSNO3), Jun. 2003, pp. 511-520, "Reliable Communication in Overlay Networks", Amir, et al.
Workshop on Large-Scale Distributed Systems and Middleware (LADIS12), Jul. 2012, 2 pages, "Intrusion-Tolerant Cloud Monitoring and Control", Obenshain et al.
IEEE Transactions on Multimedia (TOM), vol. 8, No. 6, pp. 1250-1262, Dec. 2006, "An Overlay Architecture for High Quality VoIP Streams", Amir, et al.
Spines overlay network platform, The Spines Messaging System, http://spines.org/, entire website (a 3 pg. pdf of the home page is attached hereto), May 2009, Amir, et al., accessed on the internet Aug. 14, 2013.
International Preliminary Report on Patentability issued May 28, 2015 in corresponding PCT application No. PCT/US2013/044471.
Office action mailed Sep. 21, 2015 in co-pending U.S. Appl. No. 14/693,380.
Japanese communication, with English translation, dated Dec. 22, 2015 in co-pending Japanese patent application No. 2013-554600.
European communication dated Jan. 26, 2016 in co-pending European patent application No. 12746651.4.
Final rejection mailed Feb. 19, 2016 in co-pending U.S. Appl. No. 14/693,380.
Notice of Allowance mailed Sep. 15, 2016 in co-pending U.S. Appl. No. 14/693,380.
Office action mailed Jul. 29, 2016 in co-pending U.S. Appl. No. 14/693,380.
European communication dated May 23, 2016 in co-pending European patent application No. 12746651.4.
Office action mailed Dec. 6, 2016 in co-pending U.S. Appl. No. 15/340,325.
Notice of allowance mailed Mar. 8, 2017 in co-pending U.S. Appl. No. 15/340,325.

\* cited by examiner

INTERNET-BASED VIDEO DELIVERY SYSTEM

This application is a continuation of U.S. patent application Ser. No. 13/796,053 filed Mar. 12, 2013, which claims priority of U.S. Provisional Patent Application Ser. No. 61/728,012, filed Nov. 19, 2012, the disclosures of which are incorporated herein by reference in its entirety.

BACKGROUND OF THE INVENTION

The flood of news, financial, political and other informational television programs has generated an ever increasing demand to utilize on-air experts, such as investment bankers, lawyers, and politicians. The presence of these experts adds credibility and an in-depth analysis of a given topic that is not otherwise possible.

Traditionally, for this interview to occur, the expert is forced to travel to the television studio of the television show that is interested in interviewing this expert. This involves costs for the television program, and an inconvenience for the expert. For example, the expert would have to travel to the studio, where they are prepared for the interview through hair and makeup, and appear on camera. They then travel back to their office. Often, experts appear without monetary compensation, as the publicity associated with being on-air is considered compensation. For many corporations, the publicity is not worth the lost time and expense associated with visiting a studio. In addition, such an arrangement does not allow for real-time analysis of time-sensitive events, such as breaking news, corporate mergers, or political reaction, as the experts need time and sufficient notice to travel to the studio.

To solve this problem, remote control studios have been created. In such a studio, there may be a camera, a zoom lens system, pan/tilt capability, an audio package, studio lighting package and, in some cases, an interruptible fold back system to allow the experts to hear questions from an interviewer. In some cases, a TV monitor, a VCR or DVD player may also be present. As a further enhancement, a backdrop system can be added using a large television or video monitor. Different images may be displayed on the screen to provide different backdrops, including daytime and nighttime city skylines and company logos. These backdrops help give the remote studio a more professional look on air and are an advancement over the more conventional backgrounds previously used.

Traditionally, in the case of a remote control studio, the video feed travels through a TV1, 270 Mb or 1.5 Gb fiber optic circuit to the long distance video carrier POP. Typically, the signal travels via fiber optic cable to the technical operations center, although satellite transmission is also possible. The communication infrastructure required to transmit the video feed from the remote studio to the control location may be expensive. The fiber-based long distance transmission model involves a high installation cost, high monthly recurring cost and modest per-usage cost.

In addition, the control of the camera and studio is typically at a location different from that receiving the live video feed. This control location may have dedicated equipment in order to control the camera, which may be very specialized. In addition, such equipment may only be able to control one camera at a time. Therefore, to control two cameras simultaneously, it may be necessary to have two complete sets of control equipment.

The issues associated with remote camera control are addressed in copending U.S. Patent Application Publication No. 2012/0212609, which is incorporated by reference in its entirety. However, it would also be advantageous if less expensive means were available to deliver the video stream from the remote studio to the distribution site in a reliable way.

SUMMARY OF THE INVENTION

The problems of the prior art are addressed by the present system and method for delivering content over the Internet from a content source to a destination. The system includes the use of an overlay network, built on the underlying IP network. Additionally, error correction capability is added to the overlay network to allow the destination to reconstitute packets lost during the transmission over the Internet. In one embodiment, an overlay network is created using a plurality of overlay nodes, which may be geographically distributed, either throughout the country or throughout the world. Each respective content source or destination is also a part of the overlay network. Overhead, capable of providing error correction capability, is added to the content flow as it enters the overlay network. As the content flow leaves the overlay network, this overhead is removed from the content flow. In the case of transmission errors across the overlay network, the overhead information is used to reconstitute lost packets.

DETAILED DESCRIPTION OF THE INVENTION

Figure 1:
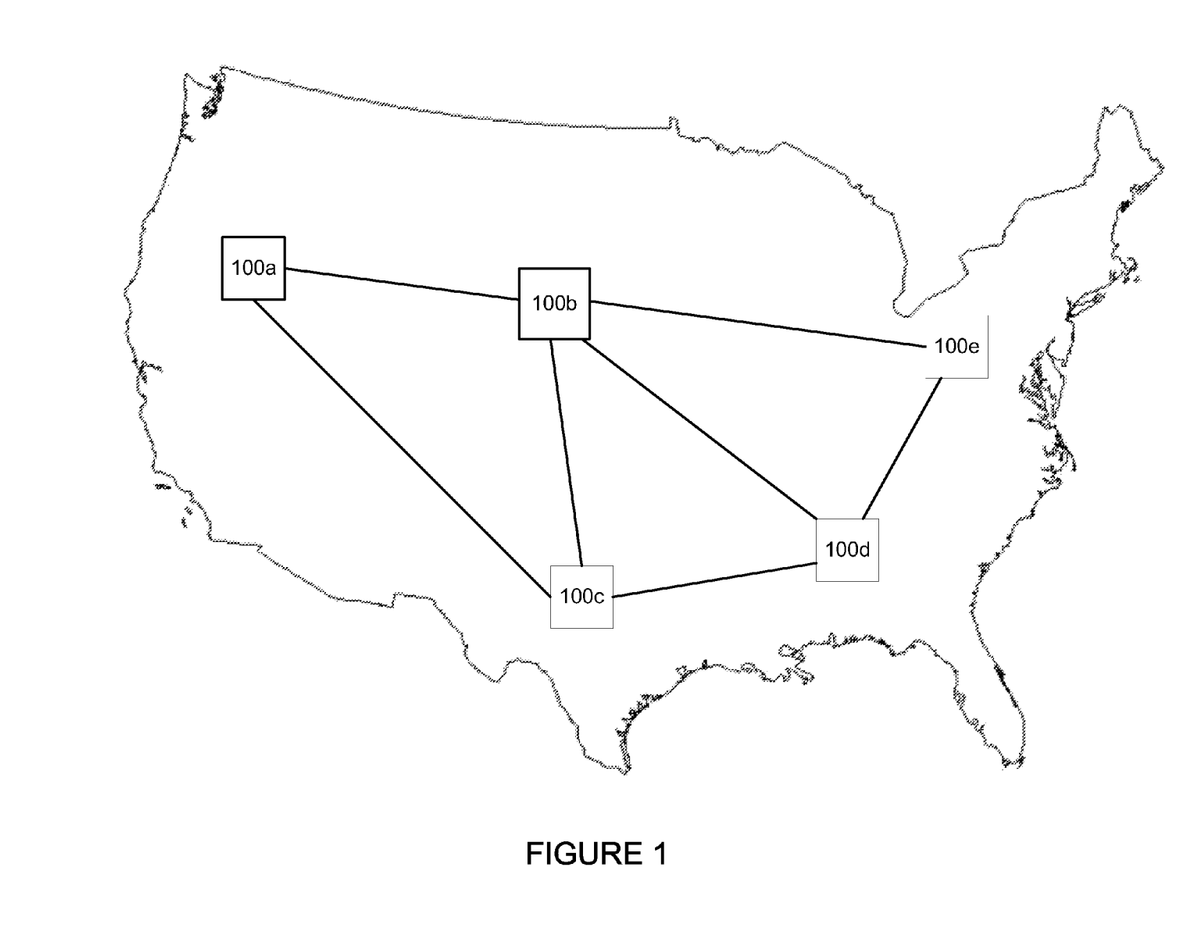
FIG. 1 represents an overlay network in accordance with one embodiment.

FIG. 1 shows a representative overlay network 10 in accordance with one embodiment. The overlay network includes a number of nodes 100a-e, which may be geographically dispensed across the transmission region of interest. While FIG. 1 shows the overlay networks located in the United States, the invention is not limited to this embodiment. For example, one or more nodes may be located in other countries. Additionally, there is no upper limit to the number of overlay nodes that may be included in the overlay network.

The overlay network serves to create reliable or semi-reliable transmissions across the underlying IP network. This overlay network may be a message-oriented overlay network (MOON), although other types of overlay networks may also be used. In one embodiment, the overlay network may be based on the implementation known as SPINES, available from www.spines.org. In other embodiments, the MOON may be based on Resilient Overlay Network (RON), available from the Massachusetts Institute of Technology. Of course, other overlay network architectures may be used as well. In one embodiment, each overlay node is a general purpose computer, executing the SPINES software and having memory elements and one or more network interfaces. The SPINES software is resident in the memory elements, and is executing by a processing unit in the general purpose computer. The processing unit may be any suitable processor, multi-core processor, or may be a plurality of processors.

The purpose of the overlay network is to reduce the time needed to re-transmit dropped packets. Traditionally, the sequence numbers are only monitored by the source and destination of a transmission on the Internet. Thus, if a destination in New York determines that a packet was dropped when receiving a content flow from a source in California, the node in New York must request retransmission of this packet. This entails sending the request through multiple nodes until it reaches the original source. By using an overlay network, this delay can be reduced. In an overlay network, each overlay node tracks sequence numbers and dropped packets. Thus, upon detection of a dropped packet, an overlay node can request retransmission from the overlay node which it received the packet from. Since these overlay nodes are closer together, the time to discover the error and request and receive a retransmission is much reduced.

Figure 2:
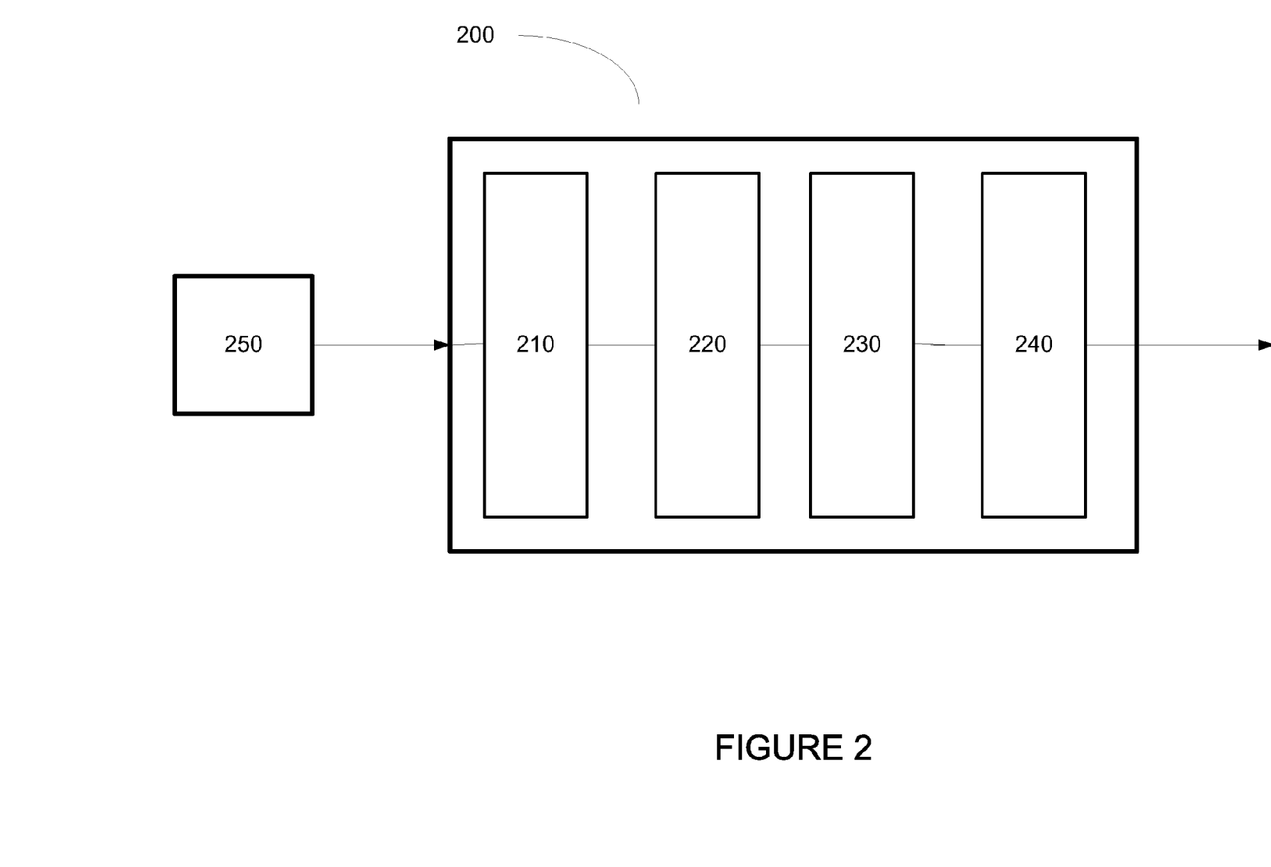
FIG. 2 shows a schematic view of the functions performed by the transmitting appliance in the present invention.

FIG. 2 shows a representative transmitting appliance 200 which may be used in accordance with one embodiment. The appliance 200 may be in communication with a video encoder 250 via an encoder interface 210. The encoder 250 encodes baseband video into an MPEG format, such as but not limited to MPEG-TS. This content flow is then divided into packets, which are sent to the transmitting appliance 200. In one embodiment, the MPEG-TS packets are transmitted via UDP. In other embodiments, a different network protocol is used to transmit the packets. Although the encoder 250 and the transmitting appliance 200 are shown as separate components, in some embodiments, these two elements may exist within one physical component.

The transmitting appliance 200 receives packets from the encoder 250 via the encoder interface 210. In the coding block 220, a predetermined number of redundant packets are created. This coding block 220 receives a group of packets, where the size of the group is predetermined, but programmable. It then uses this group of packets to create a set of redundant packets, where the number of redundant packets is selectable by the user or by the transmitting appliance 200. For example, the coding block 220 may accept ten packets, and create five redundant packets based on the information in these ten packets. The purpose of this redundancy is to create a mechanism by which the original ten packets can be reconstituted, even if those original ten packets do not reach the destination. For example, assume that the fourth of the ten original packets did not reach the destination, but the five redundant packets arrived. Using the nine original packets and the five redundant packets, it is possible to reconstruct the missing fourth packet. The number of packets in a group and the number of redundant packets are implementation decisions, and their choices are not limited by the present disclosure. Additional redundant packets provide better insurance against lost packets, since the destination is better able to reconstruct packets when more redundant information is available. Of course, this added number of redundant packets requires additional bandwidth for the transmission. Thus, if five redundant packets are created for every group of ten original packets, the content flow will require 50% more bandwidth than the original content flow.

In one embodiment, the coding block uses Forward Erasure Correction (FEC) algorithms to create the redundant packets. One such embodiment may be found at www.openFEC.org, although other embodiments may also be used. In one particular embodiment, the LDPC Staircase codec may be utilized.

The resulting set of packets (where a set is defined as the original group plus the redundant packets) is then moved to the packet formation block 230 for further processing. The packet formation block 230 generates a header for each packet in the set. The header may contain various information. For example, in one embodiment, the header includes packet sequencing information, transmission identification information, and the FEC ratio (i.e. the ratio of the redundant packets to the group size). The header is appended to each packet.

These packets are then transmitted over the overlay network using the transmission block 240. The packet formation block 230 contacts the transmission block 240 using a standard API. In one embodiment, the transmission block 240 executes the SPINES software and the API provided by the SPINES software. The transmission block 240 then forwards the packets across the overlay network.

The transmitting appliance 200 is an additional node in the overlay network shown in FIG. 1. In other words, any transmitting appliance 200 (of which there may be many, depending on the number of remote content generation sites) is an end node for the overlay network of FIG. 1.

FIG. 2 shows the transmitting appliance 200 subdivided into four blocks 210-240. This division is for illustration purposes only, and the invention is not required to partition the functions performed by the transmitting appliance 200 in this way.

Figure 3:
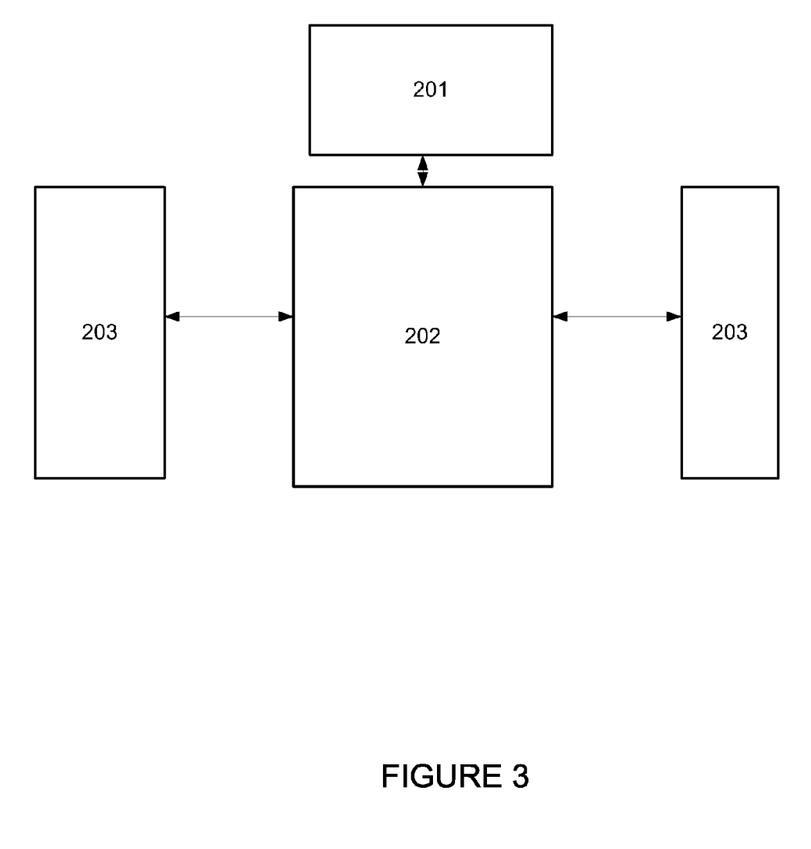
FIG. 3 shows an exemplary representation of the hardware used to construct the transmitting appliance of FIG. 2.

As shown in FIG. 3, the transmitting appliance 200 may be a general purpose computing element, having a processing unit 201, associated memory elements 202 and one or more Network Interface Cards (NICs) 203. The associated memory 202 may be in the form of semiconductor memory, magnetic memory (such as disk drives) or optical memory (such as CDROMS0. The semiconductor memory may be volatile, such as RAM, non-volatile, such as ROM, or a re-writable non-volatile memory, such as FLASH EPROM. The instructions needed to perform the functions described above are stored in the memory elements associated with the processing unit 201. The processing unit 201 may be a single processor, a multi-core processor, or may be a plurality of processors. The transmitting appliance 200 may also include other hardware, such as dedicated hardware to perform the coding (such as FEC) algorithm, or DMA (direct memory access) machines to facilitate movement of data through the appliance 200. Of course, the coding algorithm can also be performed using a software implementation running on the processing unit 201. In one embodiment, data is received from the encoder 250 via NIC 203, processed in the memory 202 by the processing unit 201, and passed out to the overlay network via the NIC 203. Of course, the transmitting appliance 200 may be constructed in a variety of different ways. For example, the transmitting appliance 200 may be a special purpose device, constructed specifically for this task. It may also be a traditional PC (personal computer), running the software needed to perform these functions. The appliance may also be integrated into third party encoding or decoding equipment to allow for compatibility with the overlay network.

As stated above, the transmission block 240 transmits the packets to the overlay network shown in FIG. 1.

Figure 4:
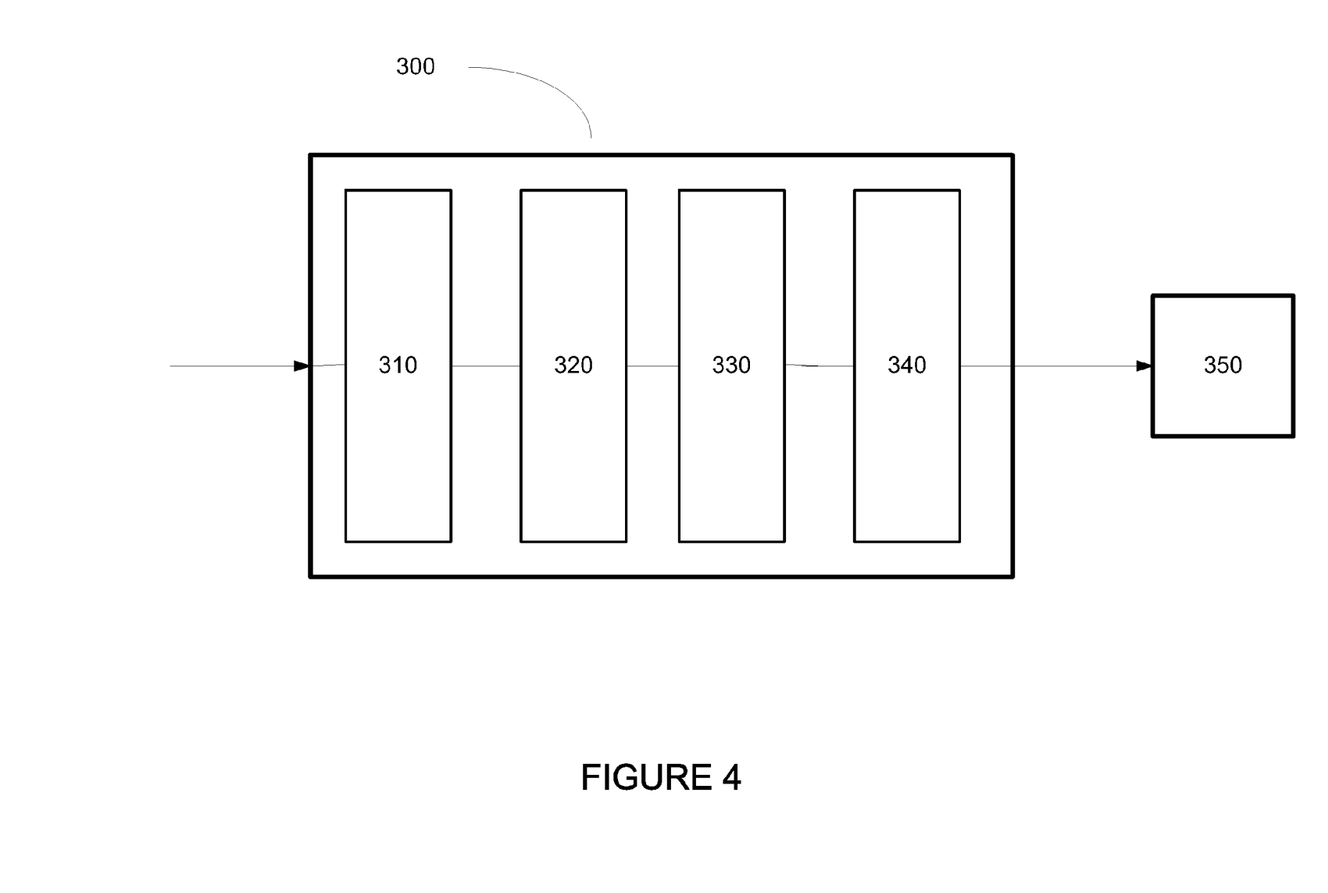
FIG. 4 shows a schematic view of the functions performed by the receiving appliance in the present invention.

At the destination, a receiving appliance is disposed. The receiving appliance is a node which is part of the overlay network shown in FIG. 1. A representative functional diagram of a receiving appliance 300 is shown in FIG. 4. The data from the overlay network enters the receiving appliance 300 and is received by the input block 310. This input block 310 may execute the same software found in the transmission block 240 of the transmitting appliance 200. In one embodiment, this software is the SPINES or RON software described above.

The input block 310 passes the received packets to the header deconstruction block 320, which serves to read the header of every packet to determine the transmission ID, the FEC ratio and current sequence number of the incoming stream. The header deconstruction block 320 uses this to detect changes in the stream in the event of stop/start of the transmitter, and is therefore also able to handle changes in FEC ratio. The header deconstruction block 320 waits to receive a set of packets (defined as a group of original packets and the redundant packets), or until a sufficient time has elapsed such that any missing packets are assumed to be lost.

The set of packets is then passed to the coding block 330, which accepts the set of packets (or the received packets from a set). The coding block 330 may then reconstruct any missing or corrupted original packets, using the information available in the set of packets. If all original packets were properly received, the coding block 330 can simply discard the redundant packets. However, in all other cases, the redundant packets are used to reconstruct the missing original packets. The packets, which define the original group transmitted by video encoder 250 to the transmitting appliance 200, are then forwarded to the output block 340. The output block 340 forwards the group of packets to a video decoder 350. This transmission may be using UDP or some other network protocol.

As described above, the video decoder 250 may be part of the same physical component as the receiving appliance 300, or may be a separate device. Furthermore, the underlying architecture of the receiving appliance 300 may be similar to that of the transmitting appliance 200, as shown in FIG. 3.

Figure 5:
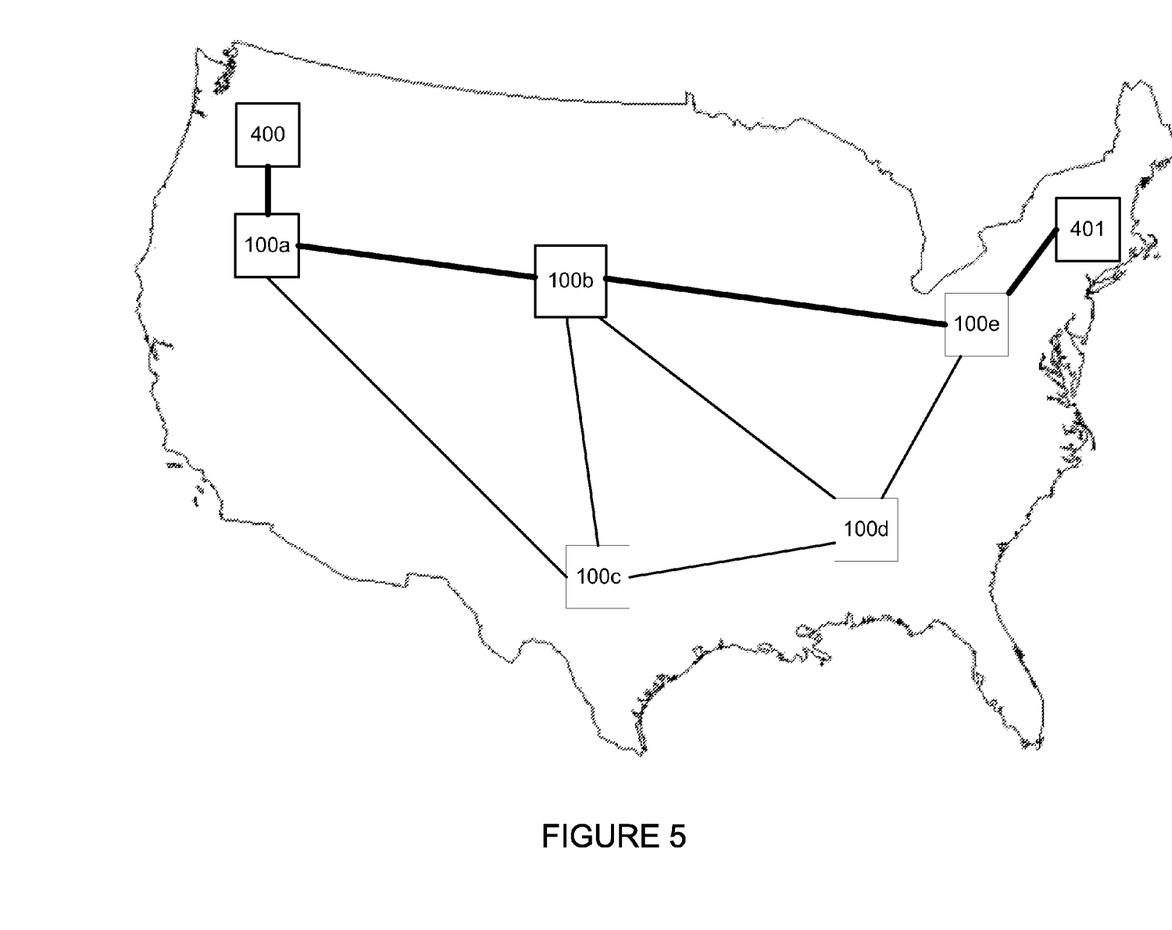
FIG. 5 shows a sample transmission across the overlay network.

The following describes one method in which the above system may operate. Referring to FIG. 5, assume that a content provider 400 is located in Oregon and the destination site 401 is in Massachusetts. A transmitting appliance is located at the content provider 400 in Oregon. This transmitting appliance receives a video stream from a video encoder, as described above. The transmitting appliance is a node on the overlay network and makes the video feed available using a protocol such as multicast.

At the destination 401, a user determines that they desire to view the video stream being sourced at the content provider 400 in Oregon. The receiving appliance, located at the destination 401, requests that multicast group from its localhost daemon. That daemon then determines the best route to the source, using the overlay nodes. In this example, the daemon selects a route that utilizes overlay nodes 100e, 100b and 100a.

The transmitting appliance transmits packets over the overlay network, after performing all of the steps and functions described above. Thus, when the content stream exits the content provider 400 and is transmitted to overlay node 100a, the individual packets each have headers, and the redundant packets have been created and are transmitted with the original group of packets. This stream reaches overlay node 100a, which checks to make sure that all packets arrive. This may be done by checking sequence numbers or some other similar mechanism. Any packets that do not arrive are requested again by overlay node 100a. The overlay node may have sufficient buffering so that it can receive packets out of order and keep track of which packets are missing. In this way, unnecessary retransmissions are minimized. The overlay node 100a does not provide any of the coding functions described above. Rather, the overlay node 100a executed the software needed to create the overlay network and forwards the packets to the next overlay node 100b. The overlay node 100b performs the same checks to insure that all of the packets have been received and forwards the packets (including the original group of packets and the redundant packets) to overlay node 100e. Overlay node 100e performs the same functions as the other overlay nodes 100a, 100b and forwards the packets to the destination 401. The receiving appliance located at the destination 401 is also part of the overlay network, so it is able to request retransmissions if it determines that one or more packets were lost.

The receiving appliance then performs the functions described above, where it strips off the headers, reorders the packets, and reconstructs any lost original packets. The original group of packets is then delivered, such as by using UDP, to the video decoder.

This configuration provides the reliability improvement inherent in an overlay network. This improvement is further augmented by using FEC (or some other forward erasure or error coding) to further protect against dropped or lost packets, thus offering a robust, low cost mechanism to transmit time sensitive information, such as a video stream across the internet.

In one particular embodiment, this Internet-based video delivery system can be combined with the remote controlled studio camera system, as disclosed in copending U.S. Patent Publication 2012/0212609. For example, the first subsystem described in that application may include the transmitting appliance described herein. The other subsystems that receive a video stream from the first subsystem, such as but not limited to the fourth subsystem, may include a receiving appliance as described herein.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

What is claimed is:

1. A remote controlled video system, comprising:
a video source, comprising a camera, a packet formation block for creating a primary video stream and a control video stream, a coding block to create redundant packets for the primary video stream which allow reconstruction of packets in the primary video stream in the event of packet loss, and a network interface for simultaneously transmitting the primary video stream and the control video stream in real time to different destinations, wherein the primary video stream is transmitted over the internet using an overlay network and is accompanied by the redundant packets and wherein the control video stream is a lower bandwidth signal than the primary video stream;
a video target, in communication with the internet, which receives packets from the primary video stream and the redundant packets from said video source, and comprising a coding block to reconstruct the primary video stream from received packets in case of loss of one or more packets; and a computer, different from the video target, in communication with the internet, adapted to receive the control video stream from the video source, and comprising means of controlling the camera of the video source based on the control video stream.

2. The remote controlled video system of claim 1, wherein the coding block in the video source and the coding block in the video target utilize forward erasure correction.

3. The remote controlled video system of claim 1, wherein the primary video stream is transmitted from the video source with an indication of an identity of the video target.

4. The remote controlled video system of claim 3, further comprising a relay server, in communication with the internet, the relay server comprising software adapted to:

authenticate the computer before allowing the computer to control the video source; and communicate with the video source and the video target so as to create a link between the video source and the video target, whereby the link is created by transmitting the indication of the identity of the video target to the video source.

5. A method of controlling a remote video system, comprising:

providing a first subsystem comprising a camera and configured to receive control signals and configured to simultaneously output a first video stream and a second video stream over the internet, wherein the first video stream is a lower bandwidth signal than the second video stream;

creating redundant packets based on the second video stream at the first subsystem;

transmitting the first video stream over the internet to a control computer, wherein the control computer is authorized to view the first video stream;

providing instructions from the control computer to the camera of the first subsystem;

using the control computer to determine a video target and provide an indication of an identity of a video target to the first subsystem;

transmitting the second video stream and the redundant packets over the internet, using an overlay network, from the first subsystem to the video target, wherein the video target is different from the control computer, using the identity provided by the control computer, wherein the first video stream and the second video stream are simultaneously transmitted by the video source; and reconstructing the second video stream based on packets received at the video target.

6. The method of claim 5, wherein said redundant packets are constructed using forward erasure correction.

7. The method of claim 5, wherein the overlay network comprises at least one intermediate node disposed between the first subsystem and the video target.

8. The method of claim 7, wherein the second video stream and the redundant packets are sent from the first subsystem to the intermediate node, and the intermediate node forwards the second video stream and the redundant packets to the video target.

9. The method of claim 7, wherein the second video stream and the redundant packets are sent from the first subsystem to the intermediate node, and the intermediate node forwards the second video stream and the redundant packets to a second intermediate node disposed between the intermediate node and the video target.

10. The method of claim 7, wherein said intermediate node does not perform the reconstructing step.

11. The method of claim 7, wherein the intermediate node requests retransmission of any missing packets.

12. The method of claim 5, wherein the indication of the identity of the video target comprises an IP address.

13. The method of claim 5, wherein the indication of the identity of the video target comprises a domain name.

* * * * *